United States Patent [19]
Park

[11] Patent Number: 4,757,400
[45] Date of Patent: Jul. 12, 1988

[54] CASSETTE HOUSING CONSTRUCTION OF A VIDEO CASSETTE RECORDER

[75] Inventor: Jong D. Park, Seoul, Rep. of Korea

[73] Assignee: Gold Star Co., Ltd., Seoul, Rep. of Korea

[21] Appl. No.: 879,575

[22] Filed: Jun. 27, 1986

[30] Foreign Application Priority Data

Jun. 28, 1985 [KR] Rep. of Korea ......... 7927/1985 UM

[51] Int. Cl.⁴ .......................................... G11B 15/675
[52] U.S. Cl. .................................................. 360/96.5
[58] Field of Search ...................... 360/96.5, 96.6, 93

[56] References Cited
U.S. PATENT DOCUMENTS 4,532,563 7/1985 Edukubo ............................ 360/96.5

FOREIGN PATENT DOCUMENTS 60-115048 6/1985 Japan .................................. 360/96.5

Primary Examiner—John H. Wolff
Assistant Examiner—Matthew J. Bussan
Attorney, Agent, or Firm—Birch, Stewart, Kolasch & Birch

[57] ABSTRACT

A housing construction of a top loading-type videocassette recorder, comprising a pair of brackets and a cassette holder disposed between the brackets. In the construction, a spring serving as a power source for operating the cassette holder and a damping mechanism for avoiding sudden vertical movement of the cassette holder are placed in a dead space possessed by an opened lid of a tape cassette above the upper surface of the cassette holder, thereby enabling the recorder to be compact and light.

1 Claim, 2 Drawing Sheets

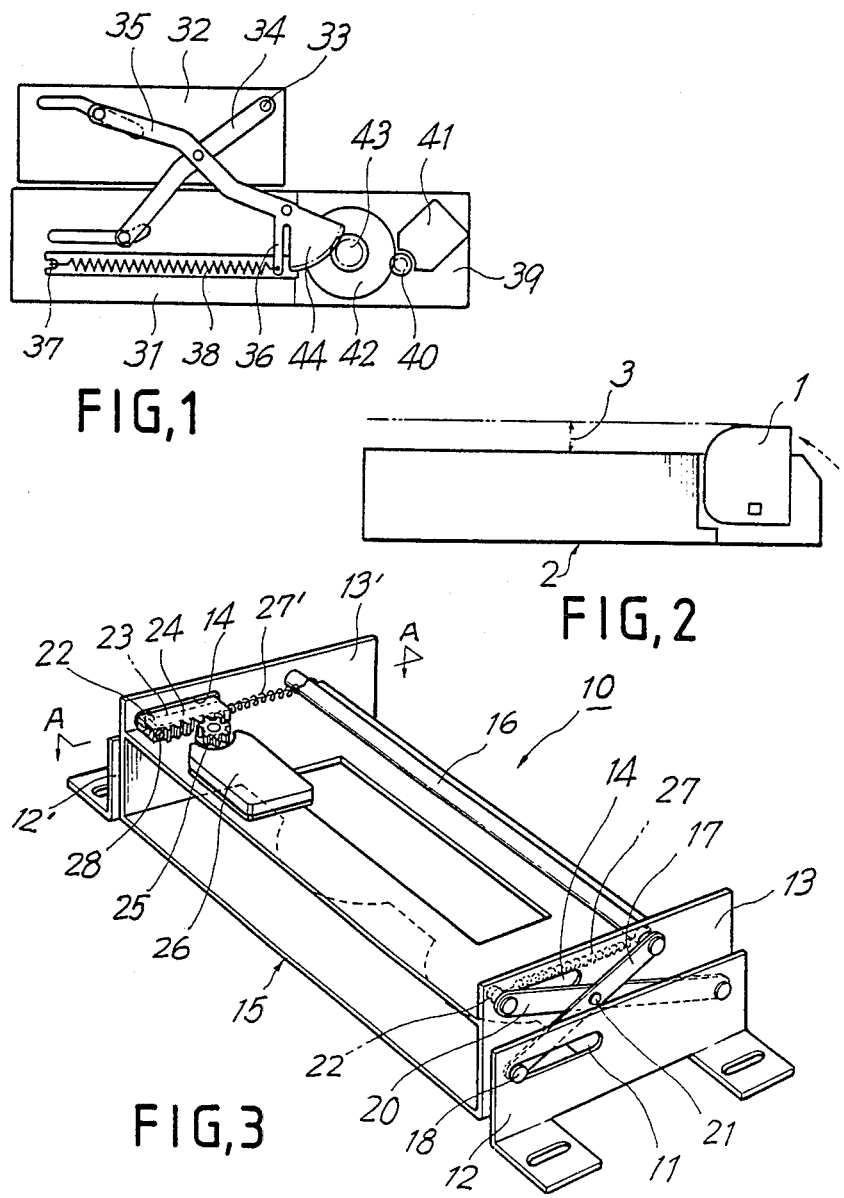

CASSETTE HOUSING CONSTRUCTION OF A VIDEO CASSETTE RECORDER

BACKGROUND OF THE INVENTION

The present invention relates to a cassette housing construction of a video cassette recorder, and particularly to a cassette housing construction of a top loading-type video cassette recorder wherein a spring serving as a power source for operating a cassette holder and a damping mechansim for avoiding sudden upward and downward movements of the cassette holder during the unloading and loading operations thereof are placed in a dead space possessed by an opened lid of a tape cassette above the upper surface of the cassette holder, thereby enabling the recorder to be compact (thin) and light.

Generally, a conventional cassette housing construction of a video cassette recorder which has been commonly used comprises a pair of brackets 31 and a cassette holder 32 connected at each side wall thereof to each bracket 31 by means of a link mechanism to move upwardly and downwardly with respect to the brackets, as shown in FIG. 1. The link mechanism comprises an arm 34 and a lever 35 crosslinked at the middle portion thereof to the middle portion of said arm 34. The arm 34 has an upper end pivotably supported at the side wall of the cassette holder 32 by means of a pin 33 fixed thereto and a lower end moveable along a slot formed at the bracket 31 by means of a pin fixed to the lower end and inserted into the slot. The lever 35 has a lower end pivotably supported at the bracket 31 and an upper end movable along a slot formed at the side wall of the cassette holder 32 by means of a pin fixed to the upper end and inserted into the slot. The lever 35 is also provided at the lower end thereof with an extension 36 to which one end of a tension spring 38 is attached. The spring 38 is attached at the other end thereof to a protrusion 37 formed at the bracket 31 and adapted to provide a force for ejecting the cassette holder 32. At the rear of one bracket 31 is disposed a damper plate 39 carrying a damper assembly 41 provided with a damping gear 40. The damper plate 39 also carries a large gear 42 engaging with the damping gear 40 and a small gear 43 coaxially fixed to the large gear 42 to rotate together therewith. The small gear 43 engages with a sector gear 44 formed at the lower end of the lever 35 so that the damper assembly 41 is operatively connected to the cassette holder 32, in order to avoid a sudden upward movement of the cassette holder 32 by a damping function thereof.

In such a conventional cassette housing construction, however, the damper plate 39 carrying the damper assembly 41 is disposed at the rear of one bracket 31, so that the space possessed by the whole construction is proportionally increased, thereby adversely affecting the compactness and the lightness of the recorder. In addition, there is a disadvantage that an excessive force is necessary for operating the cassette holder 32, in that a spring force of the tension spring 38 disposed between the protrusion 37 of the bracket 31 and the extension 36 of the lever 35 and the damping force of the damper are indirectly transmitted to the cassette holder 32.

SUMMARY OF THE INVENTION

Therefore, an object of the present invention is to provide an improved cassette housing construction of a video cassette recorder, which is able to eliminate the above-mentioned disadvantages encountered in the prior art, in order to provide a compact and light video cassette recorder.

In accordance with the present invention, this object is accomplished by providing a cassette housing construction of a video cassette recorder, comprising a pair of brackets spaced from each other and each provided, at the front of the upper end thereof, with a guide slot, a cassette holder disposed between the brackets and link-connected at each side wall thereof to each bracket by means of a link mechanism to vertically move with respect to the brackets, the cassette holder having at each side wall thereof a guide slot disposed at a position parallel to that of the guide slot of each bracket, and the link mechanism including a rod extending through both side walls of the cassette holder at the rear of the upper portion of the cassette holder, an arm having an upper end pivotably supported to each protruded end of the rod and a lower end moveable along the guide slot of each bracket by means of a pin fixed to the lower end and inserted into the slot of each bracket, and a lever link-connected at the middle portion thereof to the middle portion of the arm, the lever having a lower end pivotably supported to the rear portion of each bracket and an upper end moveable along the guide slot formed at each side wall of the cassette holder by means of a hollow pin fixed to the upper end and inserted into the slot of each side wall of the cassette holder, the construction further comprising a damping mechanism disposed at one side wall of the cassette holder at the upper portion of the cassette holder, the damping mechanism including a rack fixed at its front end to the hollow pin by means of a pin inserted into the hollow pin and extended in parallel with the guide slot of the side wall, the rack having a through-hole extended throughout the length thereof, and a damper assembly fixedly mounted on the upper surface of the cassette holder and provided with a pinion engaging with the rack; and a pair of springs disposed at both sides of the upper portion of the cassette holder, respectively, one spring being supported at one end thereof to the rod and at the other end thereof to the hollow pin fixed to the upper end of the lever, and the other spring having one end supported to the rod and the other end extended through the hole of the rack and supported to the pin fixed to the front end of the rack.

In the above-mentioned construction according to the present invention, the springs and the damping mechanism are placed in the dead space possessed by the opened lid of the tape cassette when the tape cassette is held in the cassette holder, thereby enabling the recorder to be compact and light.

The present invention can be more fully understood from the following detailed description when taken in conjunction with the accompanying drawings.

BRIEF DESCRIPTION OF THE DRAWINGS

FIG. 1 is a side view of a cassette housing construction of a video cassette tape recorder in accordance with the prior art;

FIG. 2 is a side view of a tape cassette, showing a dead space possessed by the opened lid of the tape cassette above the upper surface of the tape cassette;

FIG. 3 is a perspective view of a cassette housing construction of a video cassette tape recorder in accordance with the present invention, showing when the construction is in a recording mode or a reproducing mode;

DETAILED DESCRIPTION OF THE PREFERRED EMBODIMENT

FIG. 2 is a side view of a tape cassette, showing when a lid 1 thereof is opened. As shown in FIG. 2, the opened lid 1 possesses a space 3 of a certain height above the upper surface of the tape cassette 2. This means that a dead space has to be formed above a cassette holder of a video cassette tape recorder. In accordance with the present invention, this dead space is desirably utilized to contain a spring serving as a power source for operating the cassette holder and a damping mechanism, as will be described in detail hereinafter.

Figure 4:
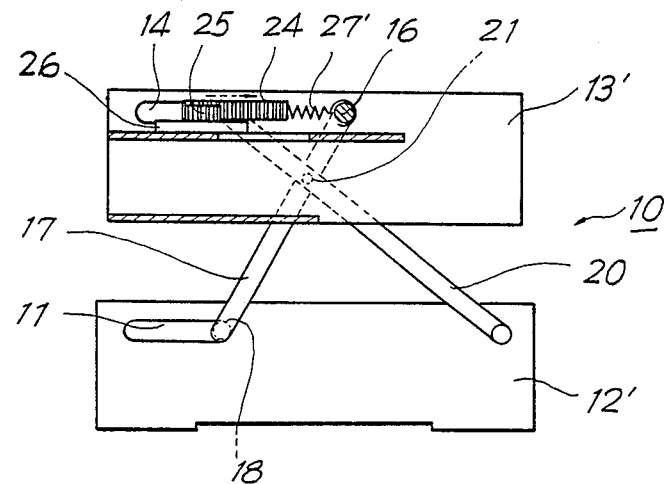
FIG. 4 is a sectional view of the housing construction of FIG. 3, showing when the construction is in an ejecting mode.
Figure 5:
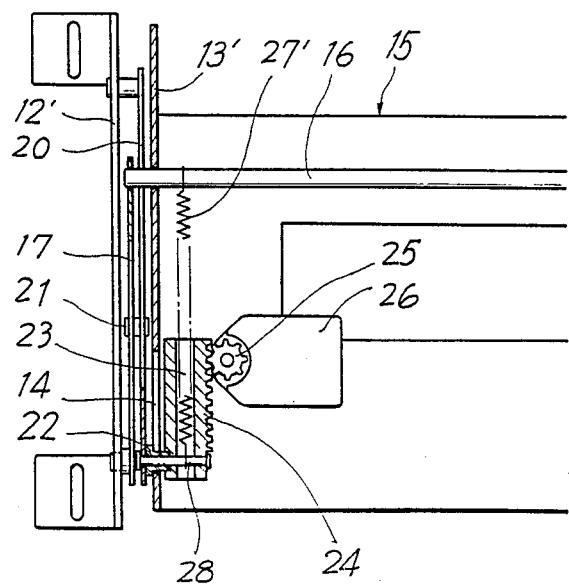
FIG. 5 is a cross-sectional view taken along the lines A—A of FIG. 3.

FIG. 3 shows when a cassette housing of the present invention is in a recording mode or a reproducing (playback) mode, while FIG. 4 shows when the cassette housing is in an ejecting mode. As shown in the drawings, the cassette housing 10 comprises a pair of brackets 12 and 12' spaced from each other, each bracket having at the frontward of the upper end thereof a guide slot 11, and a cassette holder 15 disposed between the brackets 12 and 12' and operatively link-connected to each bracket by means of a link mechanism to move upwardly and downwardly with respect to the bracket. The cassette holder 15 has both side walls 13 and 13' and upper and lower walls all of which define a space for receiving the tape cassette 2. Each side wall of the cassette holder 15 is provided with a guide slot 14 at a position parallel to that of the guide slot 11 of each bracket.

The link mechanism comprises an arm 17 and a lever 20 cross-linked at the middle portion thereof to the middle portion of the arm 17 by means of a pin 21. The arm 17 has an upper end pivotably supported each protruded end of a rod 16 extending through both side walls 13 and 13' of the cassette holder 15 at the rearward of the upper portion of the cassette holder, that is, at the rear of the rear wall of the tape cassette 2 received in the cassette holder 15. The arm 17 also has a lower end moveable along the guide slot 11 of each bracket by means of a pin 18 fixed to said lower end and inserted into the slot 11. The lever 20 has a lower end pivotably supported to the rear portion of each bracket and an upper end moveable along the guide slot 14 formed at each side wall of the cassette holder 15 by means of a hollow pin 22 fixed to the upper end and inserted into the slot 14.

As described hereinbefore, springs serving as a power source for operating the cassette holder 15 and a damping mechanism are disposed in a dead space 3 possessed by the opened lid 1 of the tape cassette 2 above the upper surface of the cassette holder 15 when the tape cassette 2 is held in the cassette holder 15, in accordance with the present invention.

The damping mechanism is disposed at one side of the upper portion of the cassette holder 15, that is, the left side adjacent to the bracket 12' in the embodiment of the present invention shown in the drawings. The damping mechanism comprises a rack 24 fixed at its front end to the hollow pin 22 by means of a pin 28 inserted into said hollow pin and extended in parallel with the slot 14 of the side wall 13' of the cassette holder 15, the rack having a through-hole 23 extended through-out the length thereof, and a damper assembly 26 fixedly mounted on the upper surface of the cassette holder 15 and provided with a pinion 25 engaging with the rack 24.

A pair of springs 27 and 27' are disposed at both sides of the upper portion of the cassette holder 15, respectively. One spring 27 is supported at one end thereof to the rod 16 and at the other end thereof to the hollow pin 22 fixed to the upper end of the level 20. The other spring 27' has one end supported to the rod 16 and the other end extended through the hole 23 of the rack 24 and supported to the pin 28 fixed to the front end of the rack 24.

In the above-mentioned construction according to the present invention, the cassette holder 15 is upwardly moved in the ejecting operation thereof, as the guide pins 18 and 22 of the link mechanism slide rearwardly along the slots 11 and 14 by the spring forces of the spring 27 and 27', respectively. The sliding movement of the guide pin 22 also causes the rack 24 fixed to said guide pin 22 to be rearwardly moved, so that the cassette holder 15 is subjected to the damping force transmitted from the damper assembly 26 via the rack and pinion, during the upward movement thereof. Thus, a sudden upward movement of the cassette holder 15 is effectively prevented.

As described hereinbefore, the springs and the damping mechanism are placed in the dead space possessed by the opened lid of the tape cassette when the tape cassette is held in the cassette holder, thereby enabling the recorder to be compact and light. In addition, since each spring is directly connected at both ends thereof to the rod connected with the arm and the lever, respectively, there is an advantage that the spring force can be small, as compared with the prior art requiring an excessive spring force due to the indirect connection of the spring.

What is claimed is:

1. A housing construction of a top loading-type videocassette recorder, comprising a pair of brackets spaced from each other and each provided, at the frontward of the upper end thereof, with a guide slot, a cassette holder disposed between said brackets and link-connected at each side wall thereof to each bracket by means of a link mechanism to vertically move with respect to said brackets, said cassette holder having at each side wall thereof a guide slot disposed at the position parallel to that of the guide slot of each bracket, and said link mechanism including a rod extending through both side walls of said cassette holder at the rearward of the upper portion of said cassette holder, an arm having an upper end pivotably supported to each protruded end of said rod and a lower end moveable along the guide slot of each bracket by means of a pin fixed to said lower end and inserted into said slot of each bracket, and a lever link-connected at the middle portion thereof with the middle portion of said arm, said lever having a lower end pivotably supported to the rear portion of each bracket and an upper end moveable along the guide slot formed at each side wall of the cassette holder by means of a hollow pin fixed to said upper end and inserted into said slot, said construction further comprising:

a damping mechanism disposed adjacent to one side wall of said cassette holder at the upper portion of said cassette holder, said damping mechanism including a rack fixed at its front end to said hollow pin by means of a pin inserted into said hollow pin and extended in parallel with the guide slot of said side wall, said rack having a through-hole extended throughout the length thereof, and a damper assembly fixedly mounted on the upper surface of said cassette holder and provided with a pinion engaging with said rack; and a pair of springs disposed at both sides of the upper portion of the cassette holder, respectively, one spring being supported at one end thereof to said rod and at the other end thereof to said hollow pin fixed to the upper end of said lever, and the other spring having one end supported to said rod and the other end extended through said hole of the rack and supported to the pin fixed to the front end of said rack.

* * * * *